United States Patent
Dowling et al.

(10) Patent No.: US 6,404,613 B1
(45) Date of Patent: Jun. 11, 2002

(54) ANIMAL STUN GUN

(75) Inventors: Michael W. Dowling, Ocean Grove; Todd L. Wilson, Long Branch, both of NJ (US)

(73) Assignee: Pulse-Wave Protective Devices International, Inc., Highlands, NJ (US)

( * ) Notice: Subject to any disclaimer, the term of this patent is extended or adjusted under 35 U.S.C. 154(b) by 0 days.

(21) Appl. No.: 09/500,941

(22) Filed: Jan. 15, 2000

(51) Int. Cl.[7] .................................................. H05C 1/04
(52) U.S. Cl. ...................................................... 361/232
(58) Field of Search .......................................... 361/232

(56) References Cited

U.S. PATENT DOCUMENTS

| | | | | |
|---|---|---|---|---|
| 3,998,459 A | * | 12/1976 | Henderson et al. | 361/232 |
| 4,667,431 A | * | 5/1987 | Mendecino | 361/232 |
| 5,088,449 A | * | 2/1992 | Lamb, Sr. et al. | 119/802 |
| 5,282,825 A | * | 2/1994 | Muck et al. | 606/203 |
| 5,467,247 A | * | 11/1995 | de Anda et al. | 361/232 |
| 6,091,597 A | * | 7/2000 | Lin | 361/232 |

* cited by examiner

*Primary Examiner*—Fritz Fleming
(74) *Attorney, Agent, or Firm*—Moser, Patterson & Sheridan LLP

(57) ABSTRACT

The animal stun gun of the invention is a non-lethal alternative to subduing a dog or other animal in an imminent attack situation where, previously, the use of firearms was the only alternative to stop its advance. The stun gun is an electrical self-defense device that uses high voltage to stop the attacking dog or animal by touching it with the prongs of its staff in turning on an electrical pulse generator to immobilize the dog or animal with a very low amperage, high voltage pulse of high frequency to make its muscles work rapidly, although not efficiently.

12 Claims, 2 Drawing Sheets

ANIMAL STUN GUN

FIELD OF THE INVENTION

This invention relates to stun guns for animals, in general, and to such stun guns for use against vicious and wild dogs, in particular.

BACKGROUND OF THE INVENTION

Stun guns that temporarily immobilize humans are in lawful use by law enforcement agencies in many parts of the United States. Recently, it has become apparent that a similar nonlethal alternative would be beneficial to subdue a vicious or wild dog, in an imminent attack situation. This has become all the more so with the increasing use by drug dealers of pit bull terriers, rottweilers and german shepherds as protectors and bodyguards in their criminal operations. As will be understood by those involved in police law administration, such dogs continue to attack, even after being initially, although not mortally, shot. Since many of the drug enterprises raided are carried on in an apartment setting, shooting in close quarters is preferably to be avoided. The understanding thus becomes clear that a nonlethal alternative is desirable—however, one which continues to be fully protective of the law enforcement personnel carrying out their sworn duties.

OBJECTS OF THE INVENTION

It is an object of the present invention, therefore, to provide an animal stun gun as this non-lethal alternative.

It is an object of the invention, also, to provide such an animal stun gun which can continue to be used effectively, even in the event that its operative nature should somehow fail.

It is another object of the present invention to provide an animal stun gun of this type which only temporarily immobilizes the animal, so as not to cause it permanent injury.

SUMMARY OF THE INVENTION

As will become clear from the following description, the animal stun gun of the invention is essentially an electrical self-defense device that employs high voltages to stop an attacking dog, although it could be used for other animals, as well. As will be seen, touching the dog with the prongs on the staff employed quickly immobilizes it, to prevent or impede any ensuing attack. However, because the amperage involved is selected quite low, serious or permanent injury is avoided. In particular, the stun gun of the invention is designed to key into the nervous system—depositing its energy into the muscles of the dog at a high pulse frequency which causes them to work very rapidly, although not efficiently. Such rapid work cycle will be understood to deplete blood sugar by converting it into lactic acid in only a matter of seconds. The energy loss which results will be recognized as making it difficult, for the dog to move and function. At the same time, the tiny neurological impulses which otherwise travel throughout the body in directing muscle movement are interrupted—thereby causing a deterioration and loss of balance which puts the dog in a passive and confused condition for several minutes. Still, on the other hand, there will be seen to be no significant effect on the dog's heart or other organs.

Specifically, and in accordance with the present invention, a preferred embodiment includes a staff of a length at least 3 feet to keep the dog away from the holder of the stun gun, along with a power source housed with the staff capable of providing pulses of electrical energy of at least one hundred thousand volts at a current of at least 2 milliamperes. This stun gun embodiment also will be seen to employ a pair of metal prongs at a first end of the staff to receive these pulses of electrical energy, with a sleeve coupled with the staff to quiescently overlay and shield the metal prongs, yet slidable rearwardly to expose them. In accordance with the invention, a switch operates with the sleeve to turn on the power source for delivering the pulses of electrical energy to the prongs, with the switch being arranged to automatically turn on the power source once the overlying sleeve is slid rearwardly a predetermined amount.

In the preferred embodiment of the invention to be described, the sleeve is moved rearwardly of the metal prongs by the force exerted by the skin of the dog against which the front end of the staff is pressed. Initially overlying the prongs by some 1 inch or so, the sleeve is spring-biased to turn off the power source and to shield the metal prongs once again upon the release of the pressure of the dog's skin. In the embodiment to be described, the power source employed is capable of providing these pulses of electrical energy at a current of substantially 3 milliamperes, within a range of three hundred–four hundred thousand volts, for a staff substantially 5 feet in length.

While any appropriate electrical power pulsing source could be employed, in accordance with the invention, such source could be included within the staff, itself—as when the staff is formed as a tubular pole—or secured to it if not so hollowed out. In further accordance with the invention, the stun gun could also employ a tightenable noose large enough to loop about the neck of the immobilized dog, for securing it to drag it to a safe location.

In the specific embodiment described below, the metal prongs employed at the forward end of the staff are selected of a "barbed" configuration, to guide and push the dog away, in the direction in which it is to be pointed until the electrical pulses take effect. At the same time, such "barbs" effectively serve as a "stop" to limit the extent of penetration of the prongs into the skin, thereby affording a degree of protection to the dog itself. The prongs, in this embodiment, are constructed of spring-steel (for example), and the switch which automatically turns on the power source once the sleeve is slid rearwardly the required amount could be fabricated as a magnetically controlled reed switch.

With the invention as thus set out, as a general rule, only a one-half second contact would be required to repel and startle the dog, producing some degree of pain and muscle contraction. Holding the prongs against the dog for a one-to-two second interval causes a degree of muscle spasm and a dazed mental state. Holding the prongs while pulse energizing over three seconds causes a loss of balance and muscle control, along with a significant amount of mental confusion and disorientation. In such circumstances, the noose could then be looped over the dog's neck to gain further control of it—all in an environment which militates against the need for having to shoot the dog until it stopped coming.

As will be appreciated by those involved in the field of police law enforcement, the bringing of a stun gun of this type to the scene generally follows from intelligence gathered from undercover personnel or from a confidential informant that at the "drug" scene, for example, such a violent protector dog is maintained.

BRIEF DESCRIPTION OF THE DRAWING

These and other features of the present invention will be more clearly understood from a consideration of the following description, taken in connection with the accompanying drawing, in which.

DETAILED DESCRIPTION OF THE DRAWING

Figure 1:
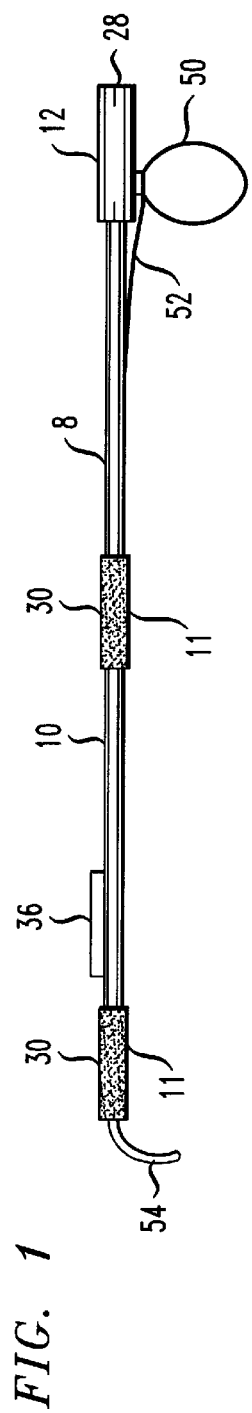
FIG. 1 pictorially illustrates an animal stun gun arranged in accordance with the preferred embodiment noted above.
Figure 2:
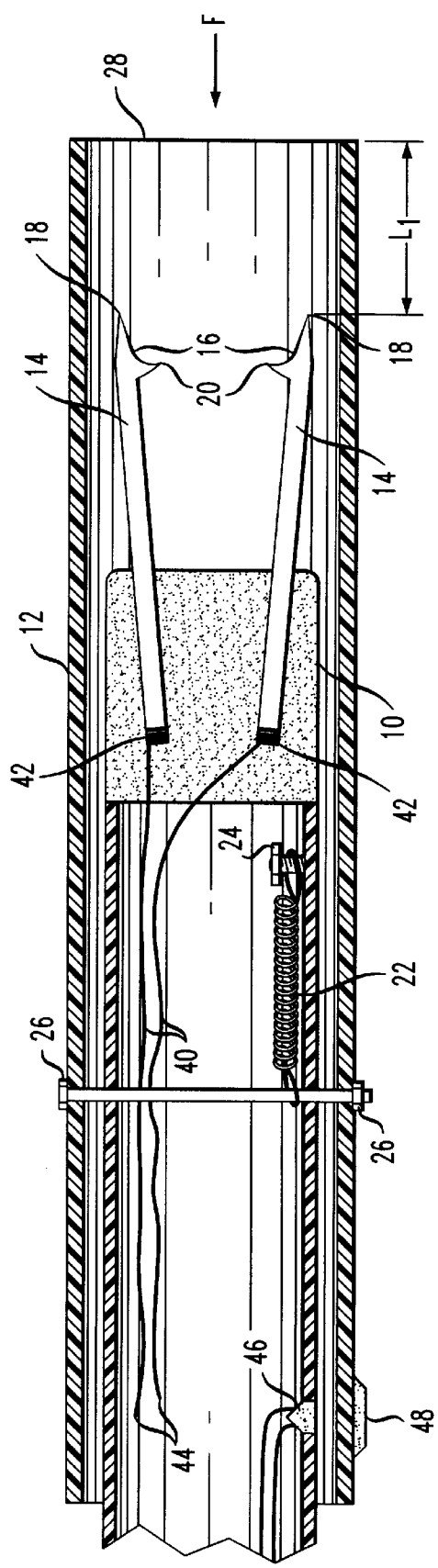
FIG. 2 is an exploded, partial view of the stun gun of FIG. 1, helpful in an understanding of its operation.

In FIGS. 1 and 2, the staff or pole of the stun gun of the invention is shown at 10, having a sleeve 12 which overlies a forward end of it, in shielding a pair of metal prongs 14, each with its own barb 16. Such prongs 14 terminate in a point 18 to penetrate the fur and skin of the dog into which the prongs are pressed, with a hook 20 serving as a stop in limiting penetration. Within the shaft 10 is a spring 22, secured by a bolt 24 at one end, with the other end being secured by a second bolt 26 which holds the shaft 10 to the sleeve 12. In the unstretched position of the spring 22 (i.e., in the position shown in FIG. 2), the sleeve closes off and shields the metal prongs 14 a distance $L_1$ of some 1 in. In this manner, a force F impressed against the front 28 of the shield 12 is in a direction to overcome the bias of the spring 22, to slide the sleeve 12 rearwardly (i.e. to the "left" in FIG. 2), and expose the prongs. Reference notation 30 identifies a pair of hand grips—preferably of foam—for the police law enforcement officer, or other user, to hold onto, in prodding the dog with the front 28 of the shield 12, to expose the prongs 14 and to electrically shock the dog. The electronics to accomplish this is shown as included within a chassis box 36 mounted to the shaft 10 (although in other designs, the electronics may be included internally of the shaft 10 itself, as when the shaft is formed of a tubular pole). In one embodiment of the invention, the shaft 10 was constructed of a polyvinylchloride pipe some 1 in. in diameter, with the sleeve 12 being similarly so constructed, but of a 1¼ in. diameter.

Also shown in FIG. 2 are a pair of electrical connectors, or wires, 40 which couple to the prongs 14, at one end 42, and whose other end 44 will be understood to connect to appropriate electronic pulse generator circuitry in the chassis box 36. A reed switch 46 likewise couples into the chassis box 36 for powering the electronics, with the switch 46 being quiescently held open by the action of a magnet 48 initially opposing it on the overlying sleeve 12, as shown. As will be appreciated, pressing the front 28 of the shield 12 against the fur and/or skin of the dog slides the shield 12 rearwardly, i.e. to the left, automatically moving the magnet 48 away, and causing the reed switch 46 to turn on the pulse generator. In so doing, the pulses of energy developed are coupled by way of the wires 40 to the prongs 14, whose tips and hooks 18 and 20 are then similarly exposed to shock the dog. Once the dog is temporarily immobilized—even over a period of time as short as 3 seconds—a noose 50 carried with the shield 12, and beneath it, can be placed to encircle the dog's neck, and when connected by way of a cable 52 through the shaft 10, can be tightened and latched as at 54, to hold the dazed dog in position. The user can then drag the dog by the noose 50 to a safe location, to be dealt with there, and then later revived.

As previously mentioned, the tipped metal prongs 14 apply the energy at a high pulse frequency sufficient to immobilize the dog in a manner of seconds, making it difficult for it to move and function. The disorientation and loss of balance which results essentially puts the dog out of commission for several minutes. Analysis has revealed that a one-half second contact with an energy pulse of at least one hundred thousand volts at a current of at least 2 milliamperes will repel and startle the animal, giving rise to a degree of pain and muscle contraction. Increasing the pulse to the order of three hundred thousand four hundred thousand volts at a current of 3 milliamperes for a contact of some one-two seconds will cause muscle spasms and a dazed mental state. With such energy applied for three seconds or longer, the dog's balance and muscle control will be lost, giving rise to the mental confusion and disorientation which allows the noose 50 to be emplaced, and tightened. By further having the shaft 10 of a length at least 3 feet, and preferably some 5 feet, the dog can be guided by the tips 18 and hooks 20 of the metal prongs 14, even in those instances where the pulse energy might be accidentally lost.

Figure 3:
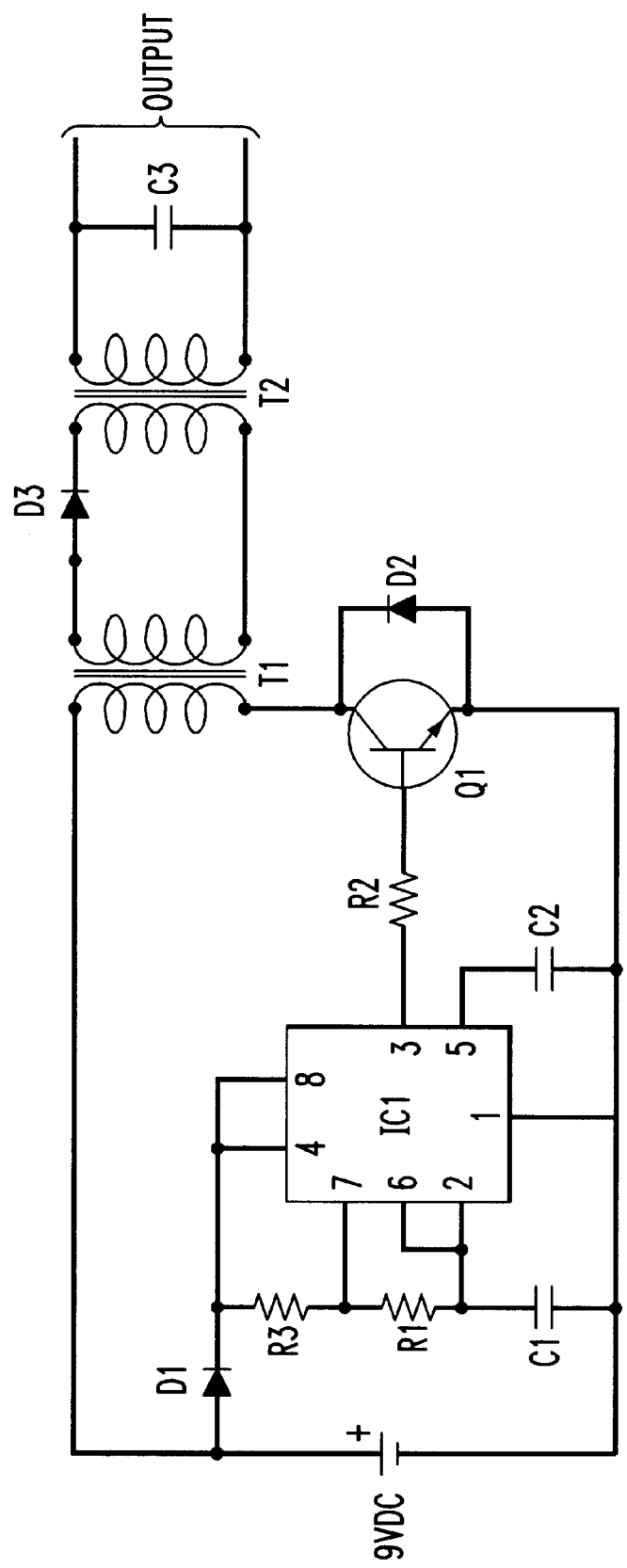
FIG. 3 illustrates a type of pulse generator which may be utilized in accordance with the teachings of the invention.

FIG. 3 illustrates a type of pulse generator which may be utilized in accordance with the teachings of the invention. The integrated circuit IC1 may be any type of astable multivibrator—as, for example, one commonly termed a 5-5-5 timer. Utilizable with either a PNP or NPN transistor (or with an MOS field-effect transistor as an alternative), the transistor $Q_1$ may be of any appropriate type, in generating a pulse of frequency of some 17–22 cycles per second. The output transformer $T_2$ steps up the voltage, to the level desired to immobilize the dog.

While there has been described what is considered to be a preferred embodiment of the present invention, it will be readily appreciated by those skilled in the art that modifications can be made without departing from the scope of the teachings herein of having a shield, retractable upon pressing against the fur or skin of a dog or other animal to automatically turn on an electric pulse generator to energize its metal prongs with sufficient voltage and current to quickly immobilize the dog or animal, in averting an impending attack. For at least such reason, therefore, resort should be had to the claims appended hereto for a true understanding of the scope of the invention.

We claim:
1. A stun gun, comprising:
a staff at least 3 feet in length;
a power source cooperating with said staff for providing pulses of electrical energy;
a pair of metal prongs at a first end of said staff to receive said pulses of electrical energy;

a sleeve slidably coupled with said staff quiescently overlaying and shielding said metal prongs; and switch means operative with said sleeve for enabling the power source to deliver said pulses of electrical energy to said prongs when said overlaying sleeve is slid from said metal prongs by a predetermined amount.

2. The stun gun of claim 1 wherein said sleeve slides away from said metal prongs in response to a force exerted by an animal against which said first end of said staff is pressed.

3. The stun gun of claim 2 wherein said sleeve is spring biased to disable said power source and to shield said metal prongs upon the removal of said force exerted by said animal.

4. The stun gun of claim 3 wherein said sleeve quiescently overlays and shields said metal prongs by a linear distance of the order of 1 inch.

5. The stun gun of claim 3 wherein said power source provides pulses of electrical energy at a current of substantially 2 to 3 milliamperes within a range of one thousand to four hundred thousand volts.

6. The stun gun of claim 3 wherein said staff is of a length having a range of substantially 3 feet to 5 feet.

7. The stun gun of claim 3 wherein said staff is of tubular cross-section, and wherein said power source is included within the hollow of said staff.

8. The stun gun of claim 3, also including a noose adjacent to said first end of said staff adapted to encircling the neck of an animal, and means for deploying and tightening said noose.

9. The stun gun of claim 3 wherein said metal prongs include respective barbs.

10. The stun gun of claim 3, wherein said metal prongs are constructed of a spring-steel composition.

11. The stun gun of claim 3 wherein said switch means includes a reed switch.

12. The stun gun of claim 11 wherein said switch means includes a magnet on said sleeve movable towards and away from said reed switch.

* * * * *